United States Patent [19]
Solari et al.

[11] Patent Number: 4,905,315
[45] Date of Patent: Feb. 27, 1990

[54] CAMERA TRACKING MOVABLE TRANSMITTER APPARATUS

[76] Inventors: Peter L. Solari, Goshen Hill Rd., R.D. 3, Box 138, Lebanon, Conn. 06249; Howard A. Miller, P.O. Box 97, Rte. 201, Hinkley, Me. 04944; Stanley G. Spencer, Westriver Rd., Cornville, Me. 04976

[21] Appl. No.: 213,896

[22] Filed: Jun. 30, 1988

[51] Int. Cl.$^4$ ............................................. G05B 1/06
[52] U.S. Cl. .................................. 318/640; 318/649; 318/560; 318/480
[58] Field of Search .................... 318/560–561, 318/590–594, 638–640, 648, 649, 480; 342/385, 386, 458, 462, 465; 358/125; 354/82, 293; 352/44, 53, 243

[56] References Cited
U.S. PATENT DOCUMENTS

| | | | |
|---|---|---|---|
| 4,067,015 | 6/1975 | Mogavero et al. | 318/560 |
| 4,143,312 | 3/1929 | Duckworth et al. | 318/649 |
| 4,223,259 | 9/1980 | Ernsberger et al. | 318/648 |
| 4,515,455 | 5/1985 | Northmore | 354/293 |

OTHER PUBLICATIONS
Lowenstein, Mark., "A Television System with Automatic Target Tracking Capability" Dec. 1967.

*Primary Examiner*—William M. Shoop, Jr.
*Assistant Examiner*—David Martin
*Attorney, Agent, or Firm*—Robert S. Smith

[57] ABSTRACT

Apparatus for mounting and positioning an associated device such as a camcorder which includes a transmitter for producing a control signal, a substantially fixed platform and a control apparatus including a plurality of sensors disposed in a plane at angularly spaced intervals about a first axis. Each of the plurality of sensors is constructed to receive a first control signal radiated by the transmitter. The apparatus also includes structure to discriminate which of the plurality of sensors is receiving the control signal from the transmitter and utilizes that information to drive the servomechanism.

18 Claims, 8 Drawing Sheets

CAMTRAC HORIZONTAL POSITIONING

CAMTRAC HORIZONTAL POSITIONING

CAMTRAC TRANSMITTER

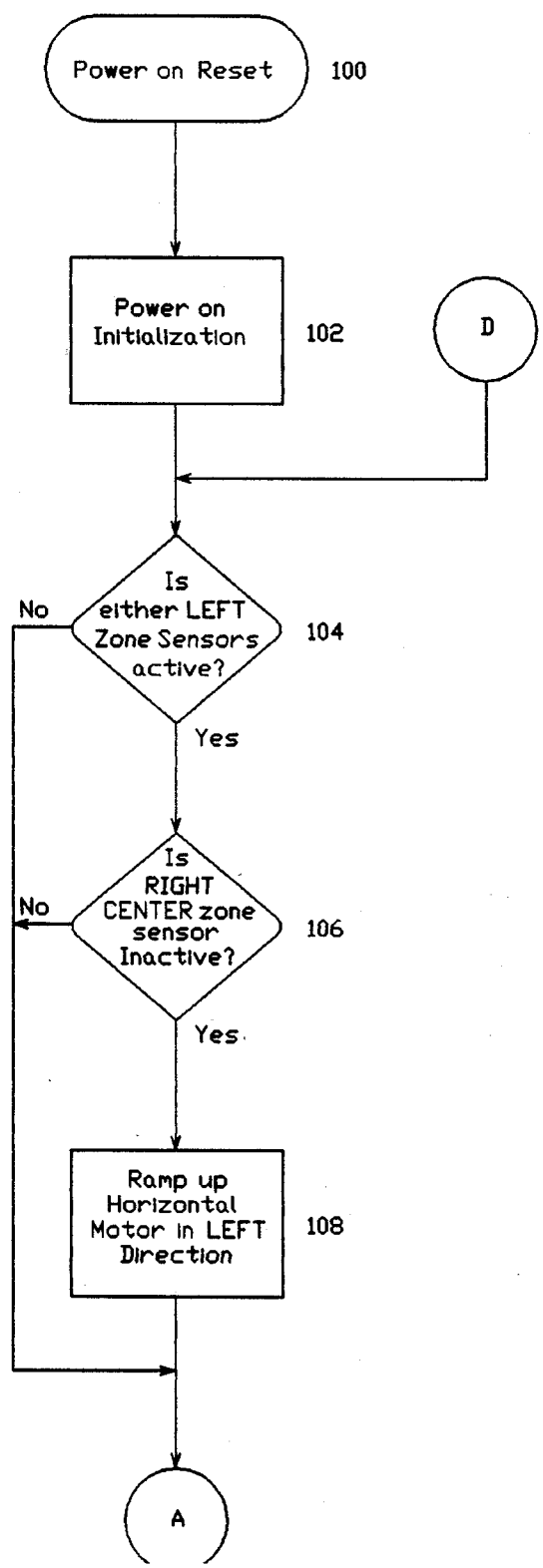

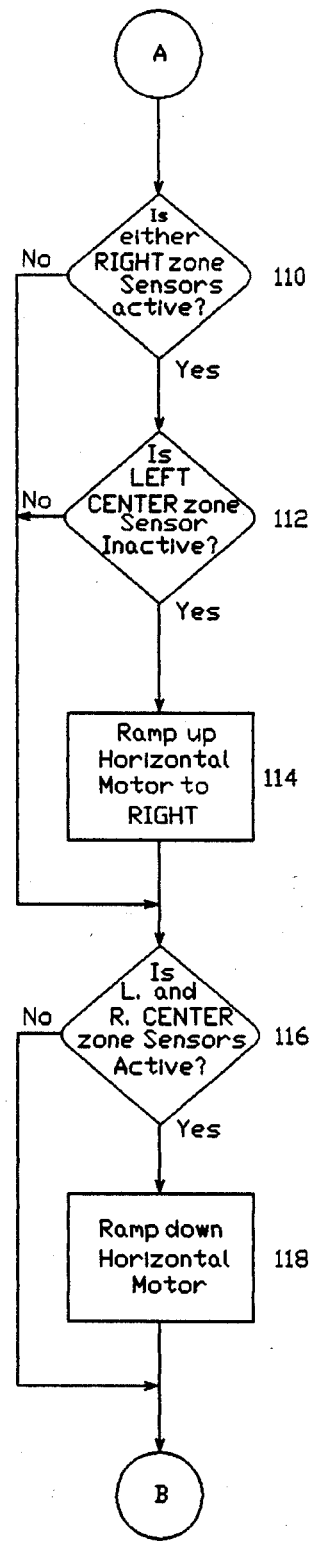

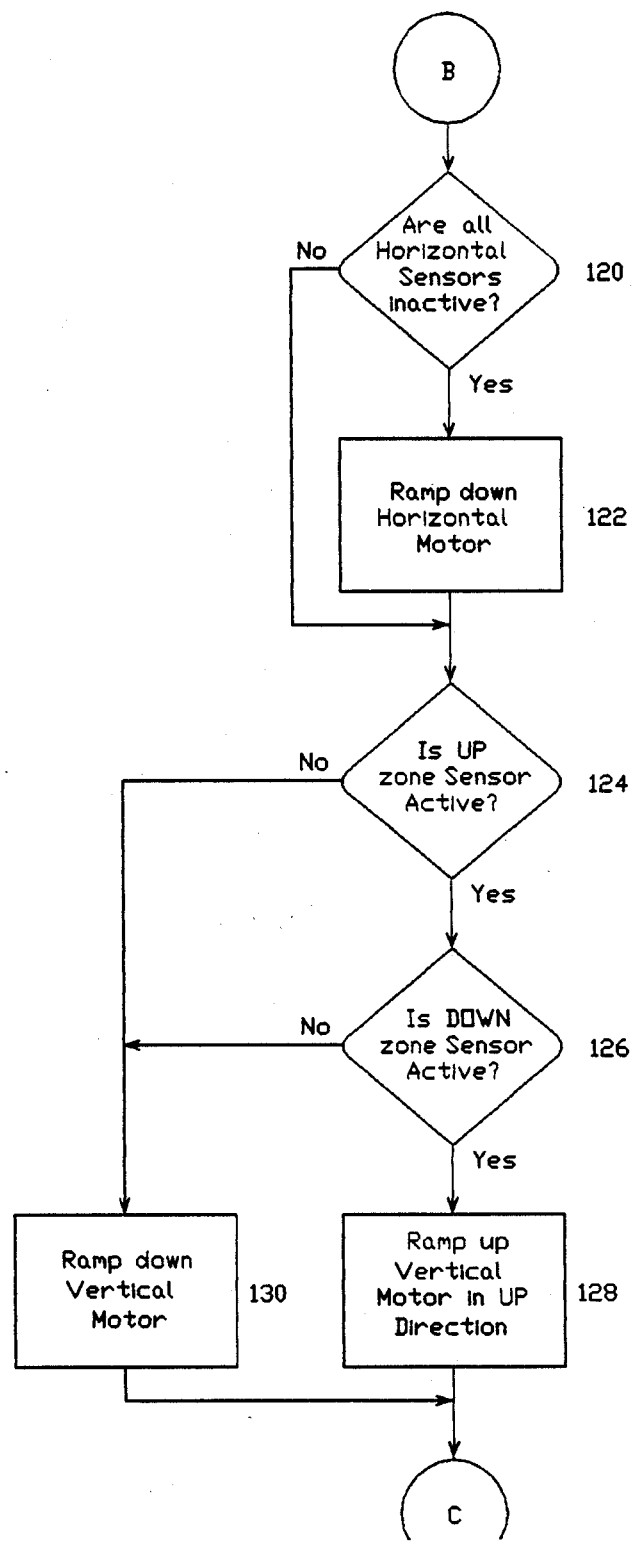

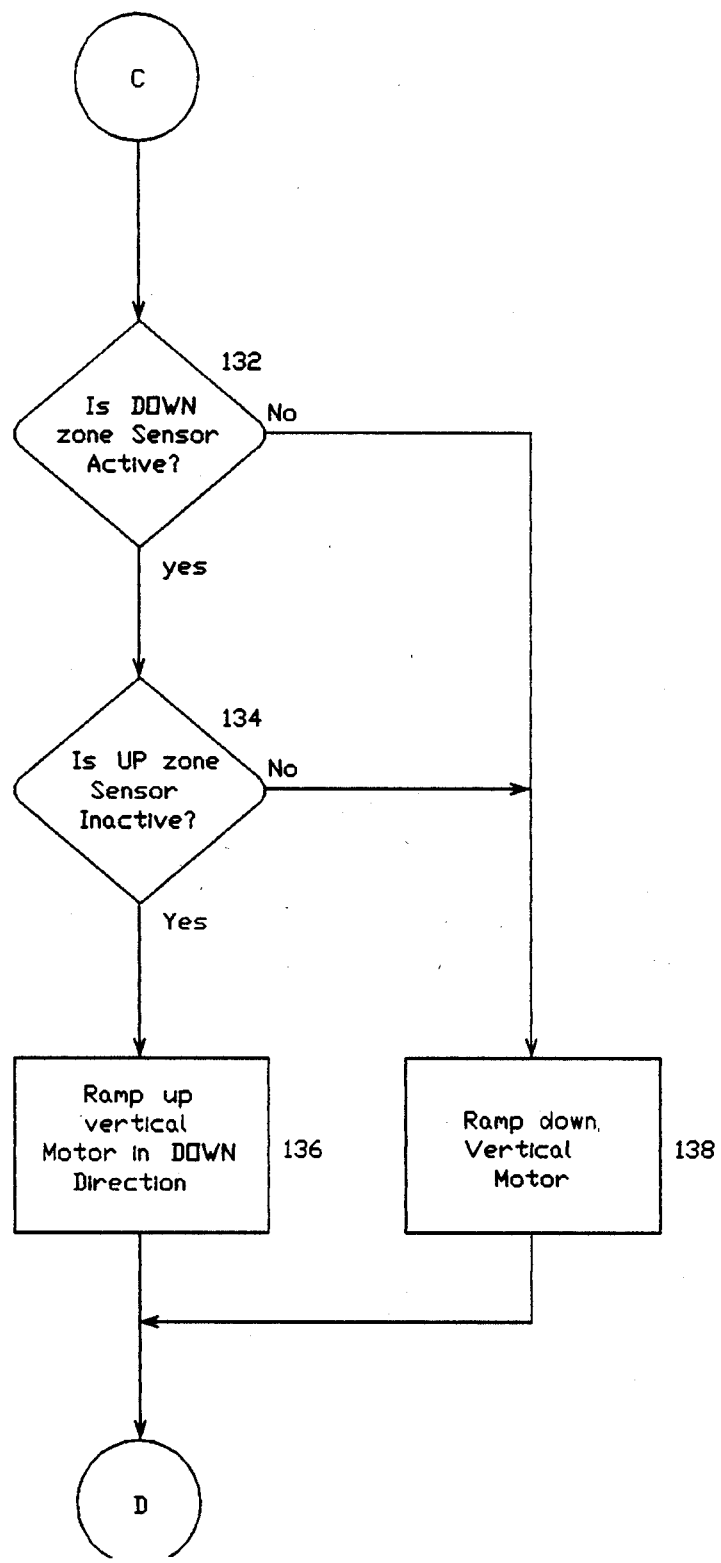

CAMERA TRACKING MOVABLE TRANSMITTER APPARATUS

BACKGROUND OF THE INVENTION

The present invention relates to a new video recorder, camera or camcorder mounting and tracking system for automatically tracking, monitoring and recording moving subjects. The term camcorder will be understood to refer to an integrated Picture and Television Engineers. That article describes an automatic television camera tracking system that signals.

The present invention is intended primarily as an accessory assembly for video recorder cameras or camcorders to provide automated tracking and recording assemblies for recreational use, instructional use, security systems, institutional uses, and military, commercial, and industrial applications. For example, the invention may advantageously be employed to direct a camera in hazardous environmental locations.

The invention is particularly suitable for use with video cameras and camcorders although those skilled in the art will recognize that the invention may also be used with a conventional movie picture camera. It will also be understood by those skilled in the art that there may be some situations where even still cameras may desirably be used with this apparatus. It will also be understood that the invention has application to other apparatus other than cameras which may be desirably be caused to align a structure with a moving object. For example, a telescope could be mounted to track a moving transmitter.

The prior art includes an article entitled "A Television System With Automatic Target Tracking Capability" By Mark G. Lowenstein, appearing in the December 1967, issue, volume 76, page 1189 of the Journal of the Society of Motion Picture and Television Engineers. United States Pat. Nos.which describe apparatus which is very generally relevant include 3,988,534, 4,121,246, 4,438,848, 4,513,317 and 4,515,455. That article describes an automatic television camera tracking system that tracks a moving target. That apparatus is capable of tracking an object that positively or negatively contrasts with the background of the object and does not use a discrete transmitter as does the present invention. That apparatus is not particularly suited for the markets for which the present apparatus is intended in that it is more expensive and complicated to build and maintain than the present invention. In addition, that apparatus is much more vulnerable to losing the object being tracked such as when the background of the object becomes similar to the object.

U.S. Pat. Nos. 3,988,534; 4,121,246; 4,386,848; 4,513,317 and 4,515,455 describe apparatus which is generally relevant.

It is an object of the invention to provide an apparatus which will positively track an object carrying a transmitter in accordance with the invention.

It is another object of the invention to provide apparatus which will be easy to use.

It is yet another object of the invention to provide apparatus which smoothly accelerates and decelerates when following an object so that, in the case of a camera, high quality pictures are produced. Still another object of the invention is to provide apparatus that has a relatively simple construction and thus may be inexpensively constructed and maintained.

SUMMARY OF THE INVENTION

It has now been found that these and other objects of the invention may be attained in an apparatus for mounting and positioning an associated device which includes a transmitter for producing a first control signal, a mounting platform, and a first control apparatus disposed on the platform. The mounting platform includes a first plurality of sensors disposed substantially in a first plane at angularly spaced intervals about a first axis, each of the first plurality of sensors being constructed to receive the first control signal radiated by the transmitter. The apparatus also includes means for discriminating which of the first plurality of sensors is receiving the first control signal from the transmitter, a servomechanism supports and moves the platform and the associated device, and means are provided for controlling the servomechanism to produce alignment of the associated device which produces a second control signal based on the location of one or more of the senors receiving the signal at any instant.

In one form of the invention the sensors in the first plurality of sensors are disposed in an array in which an equal number of sensors are disposed on each side of a first median plane extending through the first axis. The apparatus may include means to make the second control signal vary as a function of the angular displacement of the transmitter from the median plane. The angular displacement of the transmitter from the median plane is a function of the location of which of the plurality of sensors receive the first control signal. The first median plane may be generally vertical.

The apparatus may further include a second control apparatus disposed on the platform and including a second plurality of sensors disposed substantially in a second plane at angularly spaced intervals about a second axis. Each of the second plurality of sensors is constructed to receive the first control signal radiated by the transmitter and includes means for discriminating which of the second plurality of sensors is receiving the first control signal from the transmitter. The apparatus may further include means for controlling the servomechanism to produce alignment of the associated device which produces a third control signal based on the location of one or more of the sensors receiving the signal at any instant. The sensors in the second plurality of sensors may be disposed in an array in which an equal number of sensors are disposed on each side of a second plane extending through the second axis and the second control signal may vary as a function of the angular displacement of the transmitter from the second median plane. The angular displacement of the transmitter from the second median plane is a function of the location of which of the plurality of sensors receive the third control signal. The second median plane may be generally horizontal. In many embodiments the the associated device is a video camera.

BRIEF DESCRIPTION OF THE DRAWING

The invention will be better understood by reference to the accompanying drawing in which:

FIGS. 5–8 are collectively a diagrammatic flow chart illustrating the manner of operation of the software that is used in the control of the position of the camera or other device.

DESCRIPTION OF THE PREFERRED EMBODIMENT

Figure 1:
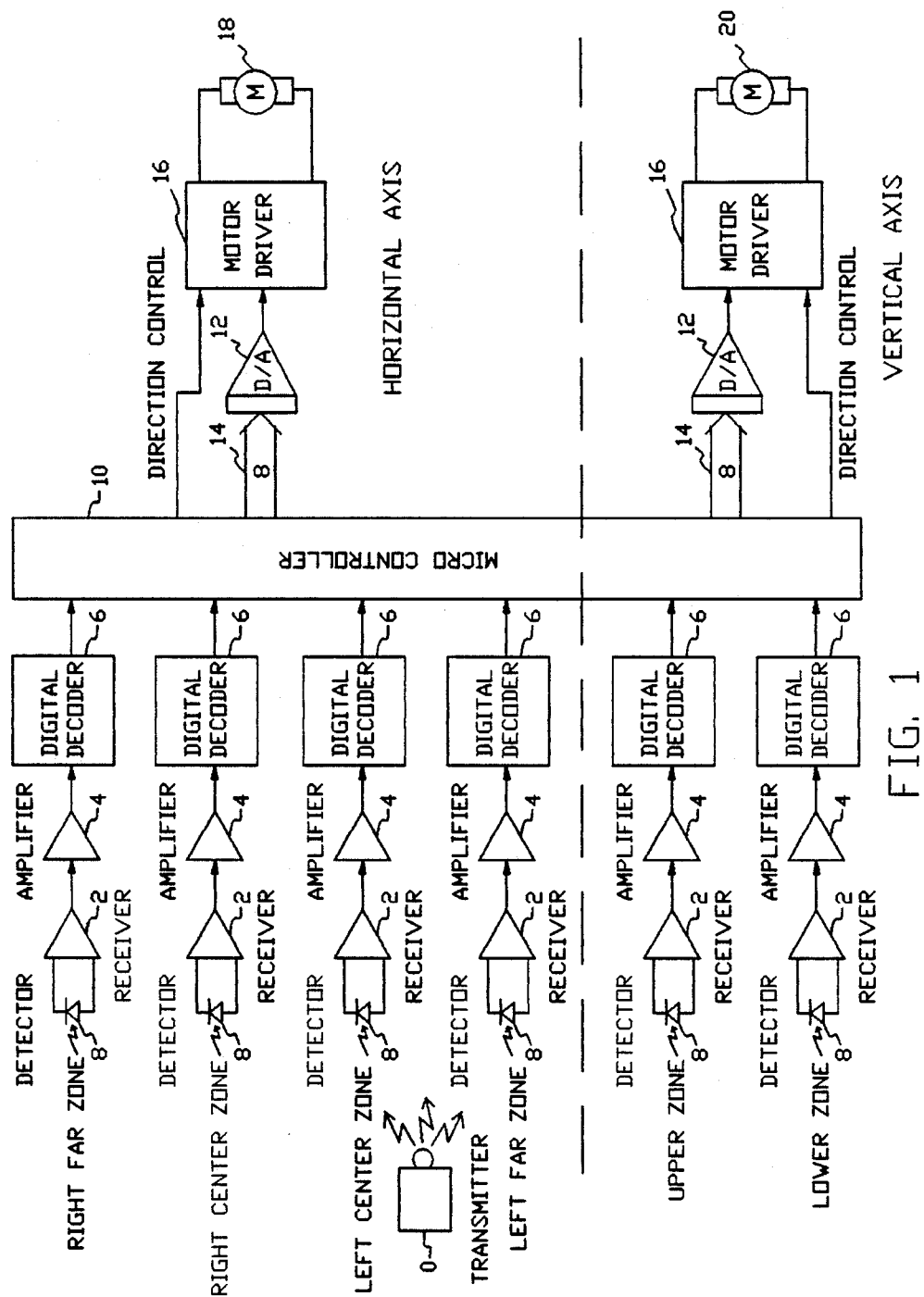
FIG. 1 is a diagrammatic block diagram of the system in accordance with the invention.
Figure 2:
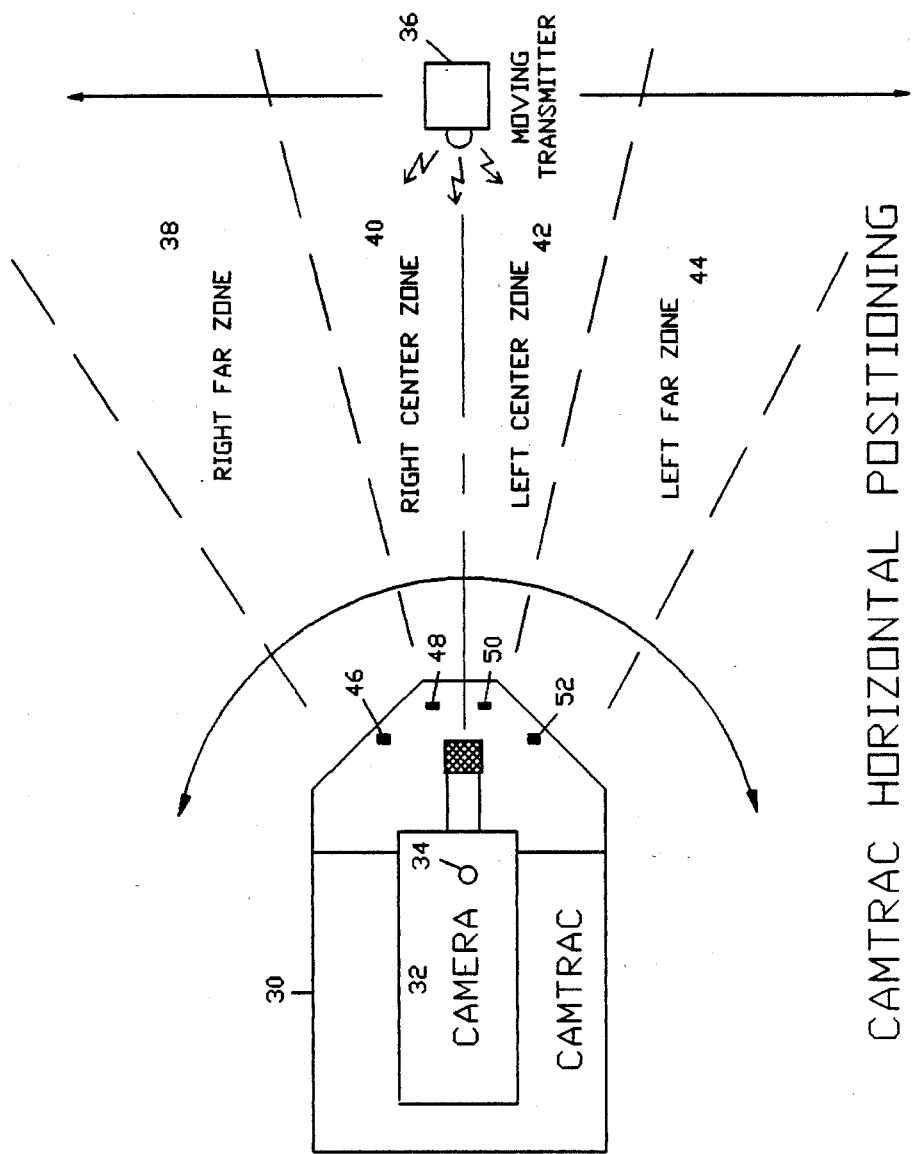
FIGS. 2 and 3 are respectively diagrammatic views of the manner in which the camera or other device is horizontally or vertically positioned.
Figure 3:
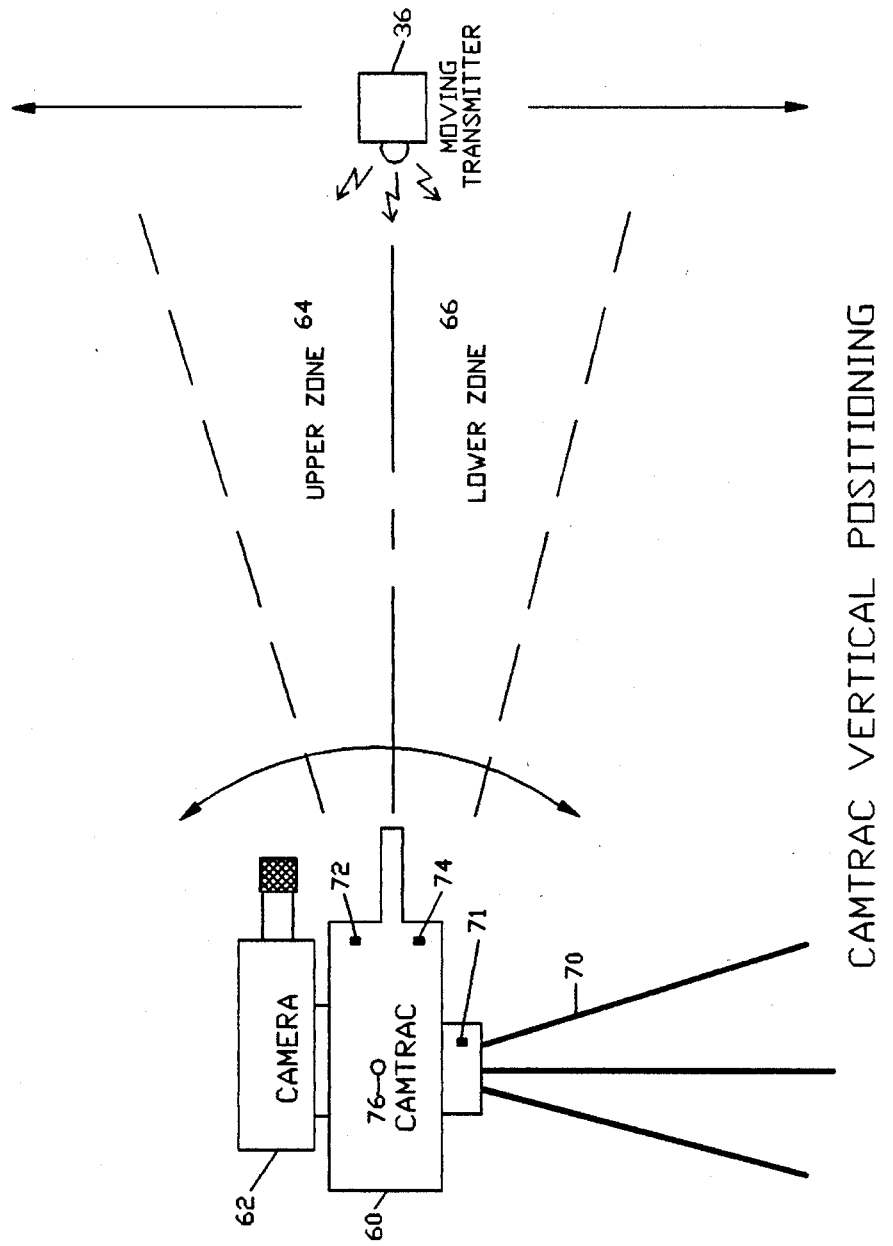
Figure 4:
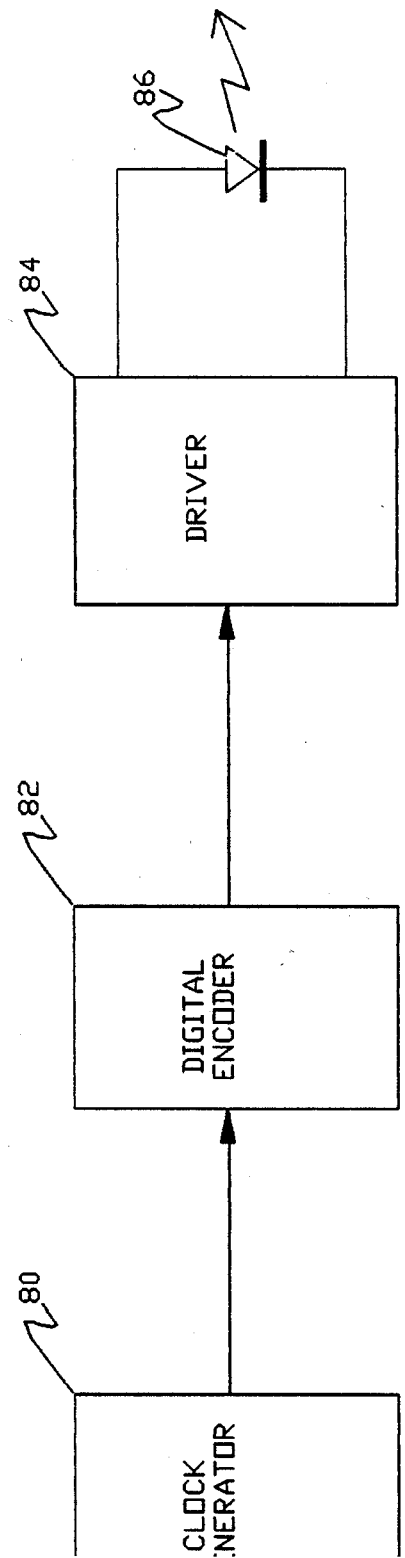
FIG. 4 is a diagrammatic view of the manner inillustrating the construction of the transmitter.

Referring now to FIGS. 1–3 there is shown the apparatus in accordance with the present invention which includes a video camera mounting and tracking system 10 comprising a tracking device 60 and a moving transmitter 36. The tracking device 60 comprises a novel mounting turntable 71 interposed between the conventional camera or camcorder 62 and a conventional tripod 70. The mounting turntable 71 is an electromechanical tracking device which permits rotational movement of the turntable 71 about two perpendicular axes for omni-directional tracking movement. A first reversible motor 18 rotates the turntable 71 in a horizontal direction around a vertical axes and a second reversible motor can simultaneously rotate the turntable 71 in a vertical direction around a horizontal axis.

The diagrammatically illustrated tracking device 60 comprises mechanical elements including a housing and a gear train (not shown separately) and electrical elements to be described in greater detail. The transmitter 36 comprises essentially only electrical elements. In accordance with the present invention a moving subject, such as a person or object "wears" the transmitter 36 and the tracking device 60 tracks the subject by movement about horizontal and vertical axes, thus maintaining camera alignment on the subject. The effective distance between the transmitter 36 and tracking device 60 is 30–50 feet maximum with the infrared system utilized in the preferred embodiment. In another form of the invention a hybrid device is used combining infrared and RF waves for a longer distance system. The transmitter 36 on the moving subject or object may in other forms of the invention use individually or simultaneously acoustical or electromagnetic wave energy. Electromagnetic signals may, for example, be in the radio, microwave, infrared or visible light frequency ranges. Some other forms of the invention may also have a remote control manual override feature.

The transmitter 36, which is worn by the moving subject, is a digital circuit comprising a clock generator 80 or oscillator, operating at 35 Khz. This square wave is fed into the digital encoder 82 which modulates the 35 Khz square wave into a pulse train. This digital encoding is necessary for discrimination when multiple apparatus in accordance with the present invention are used in the same field. The digitally encoded signal is fed into the current drive 84 which drives the infrared emitter 86. The emitter generates the electromagnetic energy which in the preferred embodiment is pulsed infrared light necessary to excite one or more of the detectors 8.

In order to track a moving subject emitting appropriate signals, the mounting turntable 71 is formed with a "face" on one side with multiple sensors 46, 48, 50, 52, 72, 74 for receiving the control signal from the transmitters. Each sensor 46, 48, 50, 52, 72, 74 comprises one of six identical circuits which each comprise an infrared detector 8, a receiver 2, an amplifier 4 and a digital decoder 6. This combination of circuits detect, amplify and process the infrared signals emitted by the transmitter 36. Four of the identical circuits are used for the horizontal plane and two are used for the vertical plane.

The positions of the detectors form zones in the field of view of the tracking device.

In the horizontal plane these zones are right far zone 38, right center zone 40, left center zone 42, left far zone 44. In the vertical plane, the zones are upper zone 64 and lower zone 66. It is the position of the single transmitter 36 in these 6 zones that will determine the direction and rate of rotation about the plane of rotation in the horizontal plane 34 and plane of rotation in the vertical plane 76. Clockwise rotation in the horizontal plane is determined by detectors 50 or 52 being activated by the transmitter 36. Counterclockwise rotation in the horizontal plane is determined by detectors 48 and 46 being activated by the transmitter 36. No rotational motion will occur in the horizontal plane when detectors 48 and 50 are activated by the transmitter 36.

Four rates of rotational velocity (including stopped or zero velocity) in each direction are provided in the horizontal plane. The four sensors 46, 48, 50, 52 are coupled through appropriate logic to a microprocessor 10 to provide four speed control of the horizontal plane motor 18. The outer sensors 46, 52 in the outer field of view of the face of the turntable 71 initiate high speed tracking motion in the horizontal direction when one of the outer sensors 46, 52 alone in right far zone or left far zone receive tracking signals from the transmitter 36 on a moving subject. When signals are received by both an outer sensor 46, 52 and an inner sensor 48, 50 on the same side an intermediate control signal actuates an intermediate speed response by the horizontal motor 18 in the direction of the moving subject. If an inner sensor 48, 50 is the only sensor receiving a signal from the transmitter 36 and thus from either the left center zone 42 or the right center zone 40 receives signals from the moving subject a slow speed motion by the horizontal motor is actuated. Finally when signals are sensed by the inner sensors 48, 50 in the left center zone 42 and the right center zone 40 the motor is stationary.

Similarly, the vertical plane clockwise rotation is determined by the detector 74 being activated by the transmitter 36 and vertical plane counterclockwise rotation is determined by the detector 72 being activated by the transmitter 36. Two rates of rotational velocity (including stopped or zero velocity) are provided in the vertical plane.

Because the primary motion will be in the horizontal plane, the variable speed motion control by multiple sensors is be provided only in the horizontal plane. The sensors 72, 74 may be provided in the vertical plane to control vertical motion about a horizontal axis at a single speed. Thus, the vertical control motor 20 drives the tracking device 60 either up or down at one rate of movement or is disposed in a stationary position. Alternatively, in other embodiments four vertical sensors may be provided for two alternative vertical speeds and a stationary position.

The micro-controller 10 has two primary functions. They are (1) monitor inputs of digital encoders 6 for all six zones and (2) provides rotational position and velocity commands to the horizontal plane motor 18 and the vertical plane motor 20. These motion commands are provided to the motors by 8 digital bits which are directed via an 8-bit bus 14 to a digital-to-analog converter 12 which converts the digital representation to an analog DC voltage level. This analog voltage, proportional to motor speed, is applied to an 'H' bridge configuration motor driver circuit 16. The motor driver circuits 16 drive the horizontal motor 18 and vertical motor 20 bidirectionally which results in clockwise or counterclockwise rotation of the tracking device 60 in the horizontal and vertical axes.

Two additional features are provided by the microcontroller 10. They are: (1) simultaneous positioning of the tracking device 60 about horizontal and vertical axes and (2) smooth ramping of rotational velocity in both horizontal and vertical axes. A major feature and advantage of this multi-speed control of the universal motion of the mounting turntable 71 is that it provides smooth movements of the recording camera.

Referring now to FIGS. 5-8 there is shown a flow chart fo the software used with the micro-controller 10. Program operation begins by turning on the power switch (not shown) to initiate a power on reset vector in the microprocessor or microcontroller 10. This executes a series of initialization operations 102 such as setting up registers, port assignments and the D/A converter to a null value so the motors 18, 20 will not rotate. The program then enters the main loop where it continuously circulates from items 104 through 136. The main loop begins by checking the left center and left far zone sensors 50, 52. If either is active, i.e. transmitter infrared energy is falling on the sensor, the program will continue to 106 else it will skip to 110. The check at 106 determines if the right center zone sensor 40 is inactive. If so, the horizontal motor 18 will ramp up or accelerate in the left direction.

The rest of the flow chart is much the same as the example described above, i.e., combinations of active sensors 46, 48, 50, 52, 72, 74 will cause motion of the motors 18, 20. If none of the sensor conditions are met, there is no motion. Each ramping routine is called from the main loop. The ramp profiles are determined by incrementing the D/A converter count each time a ramp routine is called and using a delay value. A given ramp value is incremented to cause acceleration, decremented to cause deceleration or not changed to cause constant velocity each time the the main loop is traversed. This scheme allows smooth linear ramping and simultaneous motor motion in both horizontal and vertical directions.

The apparatus in accordance with the invention is fully automatic and is a battery powered microprocessor controlled camera accessory. The apparatus will keep a camera 62 in viewing range within a 30 foot radius. The preferred form of the invention is limited to a ±/−20 degree vertical view but will encompass a full 360 degree horizontal view. A 4 hour normal operation time without recharging is possible. Continuous operation is possible with an AC adaptor.

The invention has been described with reference to its illustrated preferred embodiment. Persons skilled in the art of cameras and mounting for cameras may upon exposure to the teachings herein, conceive other variations. Such variations are deemed to be encompassed by the disclosure, the invention being delimited only by the appended claims.

Having thus described my invention we claim:

1. Apparatus for mounting and positioning a camcorder which comprises:
   a transmitter for producing a first control signal, said transmitter being dimensioned and configured for being carried on an object to be followed by the camcorder;
   a mounting platform, said mounting platform being movable about horizontal and vertical axes;
   means for carrying the associated camcorder, said means for carrying being disposed on said mounting platform;
   a first control apparatus disposed on said platform including a first plurality of sensors disposed substantially in a first plane at angularly spaced intervals about a first axis, each of said first plurality of sensors being constructed to receive said first control signal radiated by said transmitter, said first control signal being an infrared control signal having a beam width that normally extends to less than all of said first plurality of sensors at any given time;
   means for discriminating which of said first plurality of sensors is receiving said first control signal from said transmitter; a servomechanism supporting said platform and said means for carrying the associated camcorder; and
   means for controlling said servomechanism to position the camcorder, said means for controlling producing a second control signal based on the location of one or more of said first plurality of sensors receiving said signal at any instant.

2. The apparatus as described in claim 1 wherein:
   said sensors in said first plurality of sensors are disposed in an array in which an equal number of sensors are disposed on each side of a first median plane extending through said first axis.

3. The apparatus as described in claim 2 wherein:
   said second control signal varies as a function of the angular displacement from said first median plane of said sensors in said first plurality of sensors that receive said first control signal.

4. The apparatus as described in claim 3 wherein:
   said first median plane is generally vertical during normal operation of said apparatus for mounting and positioning a camcorder.

5. The apparatus as described in claim 4 further including:
   a second control apparatus disposed on said platform including a second plurality of sensors disposed substantially in a second plane at angularly spaced intervals about a second axis, each of said second plurality of sensors being constructed to receive said first control signal radiated by said transmitter, said first control signal having a beam width that normally extends to less than all of said sensors in said second plurality of sensors;
   means for discriminating which of said second plurality of sensors is receiving said first control signal from said transmitter at any given time; and
   means for controlling said servomechanism to position the camcorder, said means for controlling producing a third control signal based on the location of one or more of said sensors receiving said first control signal at any given time.

6. The apparatus as described in claim 5 wherein:
   said sensors in said second plurality of sensors are disposed in an array in which an equal number of sensors are disposed on each side of a second plane extending through said second axis.

7. The apparatus as described in claim 6 wherein:
   said second control signal varies as a function of the angular displacement from said second median plane of said sensors in said second plurality of sensors receiving said first control signal at any given time.

8. The apparatus as described in claim 7 wherein:

said second median plane is generally horizontal during normal operation of said apparatus for mounting and positioning a camcorder.

9. Apparatus for mounting and positioning an associated camcorder which comprises:
   a mobile transmitter producing a first control signal, said first control signal being an infrared signal;
   a mounting platform;
   a first control apparatus disposed on said platform including a first plurality of sensors disposed substantially in a first plane at angularly spaced intervals about a first axis, each of said first plurality of sensors being adapted to receive said first control signal from said transmitter, said first control signal having a beam width which normally does not extend over all of said first plurality of sensors at any given time;
   first means for determining which of said first plurality of sensors is receiving said first control signal from said transmitter;
   a servomechanism supporting said platform and the associated device; and
   first means for controlling said servomechanism to position the camcorder, said first means for controlling producing a second control signal based on the location of one or more of said first plurality of sensors receiving said signal at any given time.

10. The apparatus as described in claim 9 wherein said:
    first plurality of sensors are disposed in a first array whereby an equal number of said first plurality sensors are disposed on each side of a first median plane are disposed on each side of a first median plane extending through said first axis.

11. The apparatus as described in claim 10 wherein said:
    second control signal varies as a function of the angular displacement of said transmitter from said median plane.

12. The apparatus as described in claim 11 wherein:
    said first median plane is generally vertical during normal operation of said appartus for mounting and positioning.

13. The apparatus as described in claim 12 further including:
    a second control apparatus disposed on said platform and including a second plurality of sensors disposed on said platform and including a second plurality of sensors disposed substantially in a second plane at angularly spaced intervals about a second axis, each of said second plurality of sensors being adapted to receive said first control signal radiated by said transmitter;
    second means for determining which of said second plurality of sensors is receiving said first control signal from said transmitter;
    second means for controlling said servomechanism to position the camcorder, said second means for controlling producing a third control signal based on the location of one or more of said second plurality of sensors receiving said first control signal at any given time.

14. The apparatus as described in claim 13 wherein:
    said second plurality of sensors are disposed in a second array whereby an equal number of said second plurality of sensors are disposed on each side of a second median plane, said second median plane extending through said second axis.

15. The apparatus as described in claim 14 wherein:
    said second control signal varies as a function of the angular displacement of said transmitter from said second median plane.

16. A method for controlling the location of a camcorder comprises the steps of:
    providing a transmitter producing an infrared signal beam;
    providing a rotational tracking device;
    positioning a first plurality of sensors in a first plane for receiving said first signal beam;
    positioning a second plurality of sensors in a second plane perpendicular to the first plane for receiving the infrared signal beam;
    determining which of said sensors in said first plurality of sensors are receiving said infrared signal beam and using this determination to operate a first motor to orient said camcorder in one plane; and
    determining which of said sensors in said second plane are receiving said infrared signal beam and using this determination to operate a second motor to orient said camcorder in another plane.

17. The method for controlling the location of a tracking device of claim 16 including:
    the step of positioning said first plurality of sensors a uniform distance apart from each other in said first plane.

18. The method for controlling the location of a tracking device of claim 17 including:
    the step of positioning said second plurality of sensors a uniform angular distance apart from each other in said second plane.

* * * * *